United States Patent [19]

Russell

[11] Patent Number: 5,292,183
[45] Date of Patent: Mar. 8, 1994

[54] COMBINATION AIR/HYDRAULIC INTERMITTENT BRAKING SYSTEM

[76] Inventor: Carl D. Russell, P.O. Box 334, Sallisaw, Okla. 74955

[21] Appl. No.: 905,298

[22] Filed: Jun. 24, 1992

[51] Int. Cl.⁵ .............................................. B60T 13/58
[52] U.S. Cl. ...................................... 303/2; 188/106 P
[58] Field of Search ................. 303/2, 7, 13, 9.76, 303/10, 11, DIG. 2-DIG. 4, 118.1; 188/106 P, 106 R, 170

[56] References Cited

U.S. PATENT DOCUMENTS

| | | | |
|---|---|---|---|
| 2,680,500 | 6/1954 | Jenkins | 188/106 P X |
| 2,845,148 | 7/1958 | Sturgill | 188/106 P X |
| 2,905,273 | 9/1959 | Kohler | 188/106 P X |
| 2,934,380 | 4/1960 | Julier et al. | 188/106 P |
| 3,747,993 | 7/1973 | Bartholomew | 303/68 |
| 3,854,501 | 12/1974 | Machek | 303/118.1 X |
| 5,050,940 | 9/1991 | Bedford et al. | 303/DIG. 4 X |

FOREIGN PATENT DOCUMENTS

| | | |
|---|---|---|
| 3312981 | 10/1984 | Fed. Rep. of Germany ... 303/DIG. 3 |
| 3636185 | 2/1988 | Fed. Rep. of Germany ... 303/DIG. 1 |
| 3923853 | 10/1990 | Fed. Rep. of Germany ... 303/118.1 |

*Primary Examiner*—Robert J. Oberleitner
*Assistant Examiner*—Alfred Muratori

[57] ABSTRACT

A unique addition of hydraulic cylinders, valves, switches and a pump to assist the existing air brake system now used on todays tractor-trailer trucks without altering the basic function of the air brake system and provides independent, boosted intermittent braking without expelling the air.

6 Claims, 6 Drawing Sheets

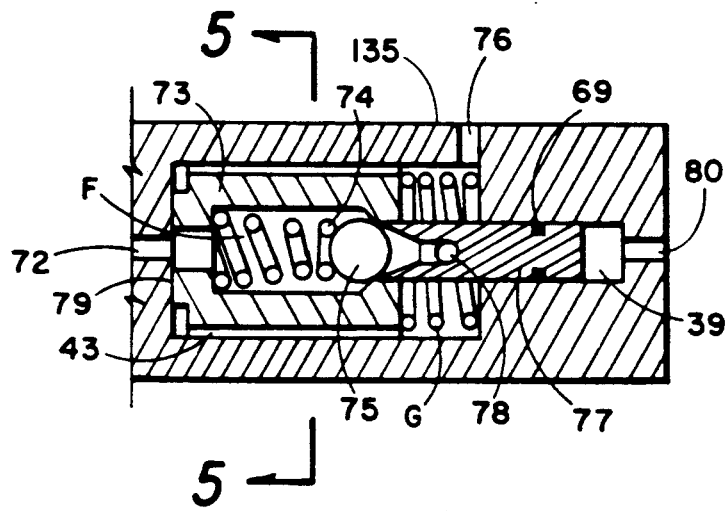
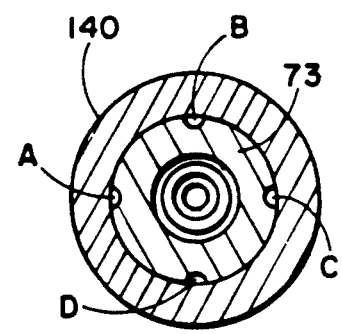
Fig. 4
Fig. 5
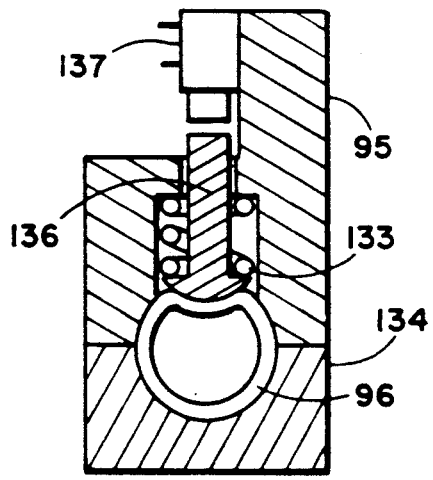
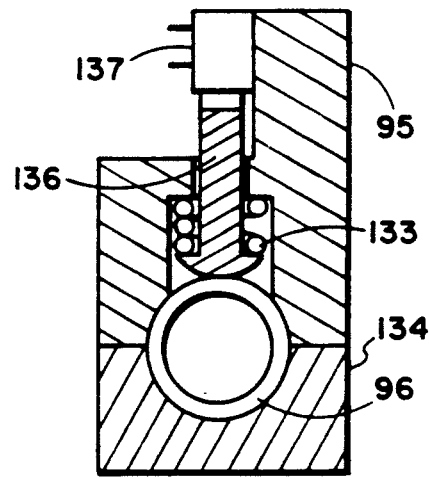
Fig. 6
Fig. 7

COMBINATION AIR/HYDRAULIC INTERMITTENT BRAKING SYSTEM

BACKGROUND OF THE INVENTION

The large tractor truck manufacturers striving to achieve better fuel economy are using redesigned diesel engines. The loads are larger and multiple trailers are being pulled. The requirements for compressed air is growing beyond the on board compressor's capacity. The addition of this hydraulic system not only can assist the existing air brake system, but provides intermittent brakes which has proven to be a much safer, shorter braking action without exhausting their valuable air during intermittent braking.

FIELD OF THE INVENTION

Todays large truck air brakes are dangerously marginal on mountainous roads and congested freeways where frequent use of their air brakes is required. The combining of the hydraulic system and the present air brake system does not impede the operation of the air brake system, and provides an independent hydraulic intermittent braking application and a fail safe mode. The combination AIR/HYDRAULIC INTERMITTENT BRAKING SYSTEM is applicable to the tractor, and is also applicable to the trailer.

The AIR/HYDRAULIC INTERMITTENT BRAKING SYSTEM operates on differential pressure controlled by force transmitter 130 establishing the reference or base pressure. The reference pressure is a variable controlled by the application of the air brakes which translates mechanical force into a reference hydraulic fluid pressure. This reference operates the threshold pressure switch 40 turning on the hydraulic power source and controls the pressure requirements of the hydraulic cylinders 100 and 100' and frequency of their intermittent braking.

DESCRIPTION OF THE DRAWINGS

FIG. 4. Cross section of differential valve assembly.

FIG. 5. Cross section showing flutes.

FIG. 6. Cross section of enabling switch assembly with truck in park.

FIG. 7. Cross section of enabling switch assembly with truck in motion.

OPERATION

Figure 10:
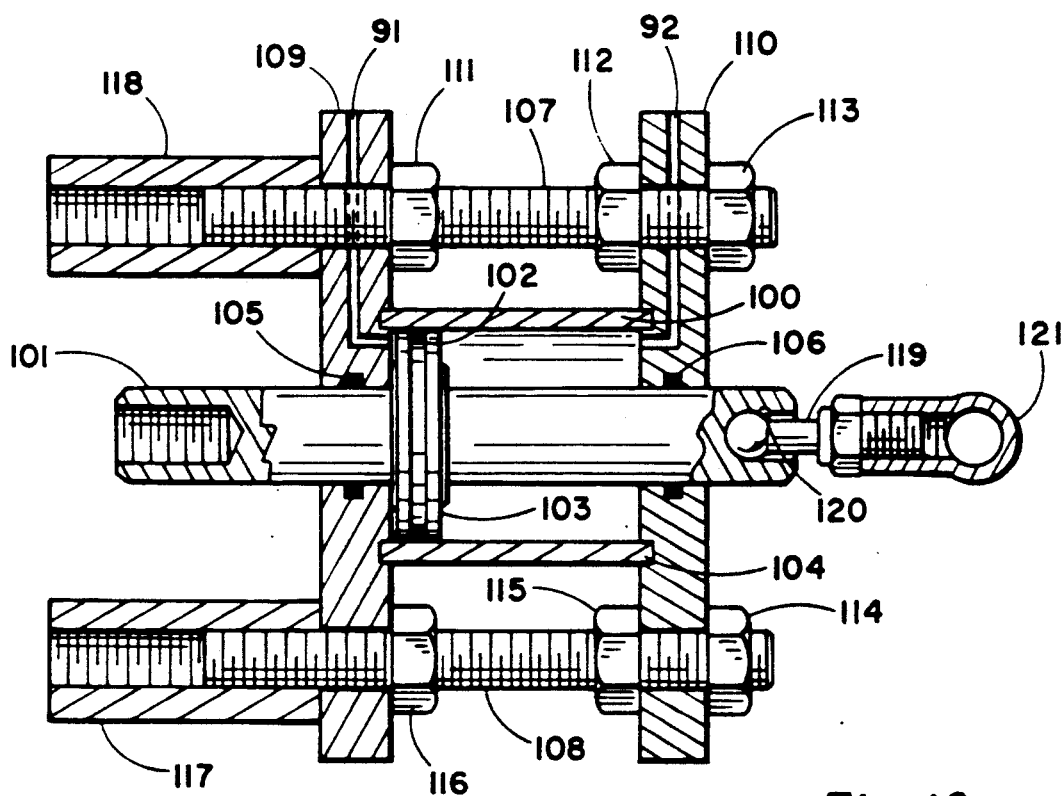
FIG. 10. A cross section of wheel cylinder assembly.

Todays over the road large trucks equipped with air brakes have spring loaded parking brakes which are activated when the operator stops and places the control into park position or automatically activates when the air pressure is depleted below a predetermined level. The springs are contained in canisters 128 and 128' (FIG. 1) and forces shaft 101 and 101', piston 103 and 103', pivot 119 and 119' (FIG. 10), clevis 121 and 121', and lever 122 and 122' (FIG. 1) to the right, turning cam 123 and 123', expanding front shoes 125 and 126, rear shoes 125' and 126' into drum 124 and 124' setting the parking brakes. The lack of adequate air pressure in flexible conduit (FIG. 1) opens enabling switch 137 (FIG. 6).

When a truck operator wants to move the vehicle, the motor must drive the on board compressor to build up a predetermined pressure before the parking brakes can be released. With adequate air pressure the operator can activate the parking brake release mechanism and at that time air pressure enters ports 94 and 94' into cansiter 128 and 128' (FIG. 1) compressing the parking brake springs releasing the force on force transmitter 130, shaft 101 and 101', clevis 121 and 121' and lever 122 and 122' to the left (FIG. 8), rotating cam 123 and 123' releasing front brake shoes 125 and 125' and rear brake shoes 126 and 126' from brake drums 124 and 124'.

At this point the vehicle parking brakes are released allowing normal operation. It is important to note that the air pressure in ports 94 and 94' and flexible conduit 96 into canister 128 and 128' must be maintained to hold the parking brake in "off" position. The pressure in flexible conduit 96 (FIG. 7) forces plunger 136 to compress spring 133 closing contacts of enabling switch 137. The circuit from battery 10, cable 11, wire 13 to now closed contacts of enabling switch 137, to wire 14 to switch 40 (FIG. 8) (in park without pressure in flexible conduit 96, (FIG. 6) spring 133 forces plunger 136 away from enabling switch 137 to open). Returning to the run position (FIG. 8) with parking brakes off and enabling switch 137 closed maintaining operating voltage to normally open switch 40.

The operator depresses the brake pedal activating the air brakes. Air pressure enters port 93 and 93' (FIG. 1) of cansiter 127 and 127' extending force transmitter 130, shaft 101 and 101' (FIG. 8), piston 103 and 103', clevis 121 and 121' and lever 122 and 122' to the right rotating cam 123 and 123' causing front brake shoes 125 and 126 and rear brake shoes 125' and 126' to expand in brake drums 124 and 124' respectively. The hydraulic fluid in cylinder 100 and 100' (FIG. 1), on the port 92 and 92' side of pistons 103 and 103' exits through conduit 83 and conduit 89 combining into conduit 65, port 63, port 45, conduit 26 and conduit 24 into reservoir 23.

Figure 2:
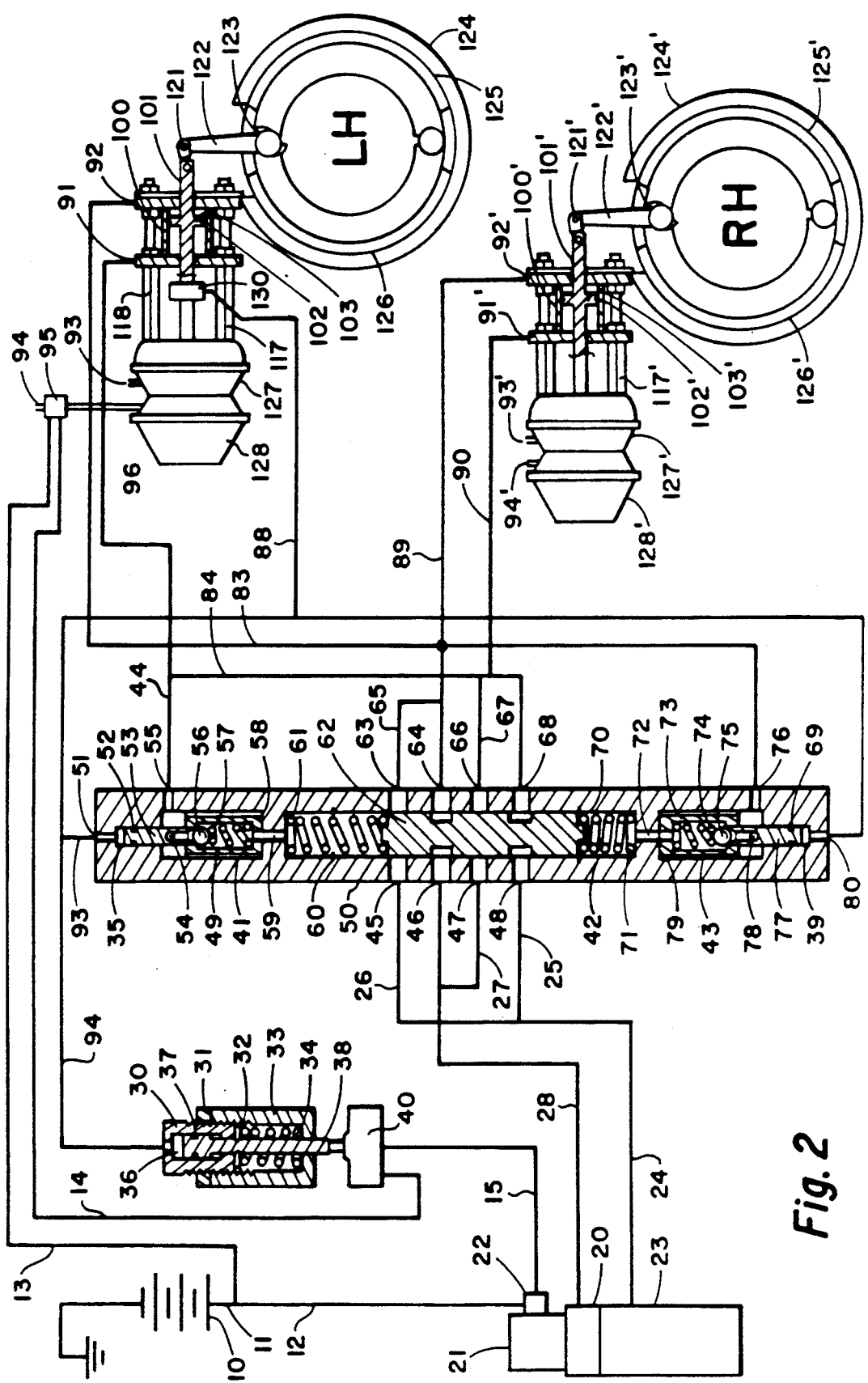
FIG. 2. Schematic drawing with intermittent valve directing fluid pressure to release trucks air brakes.
Figure 3:
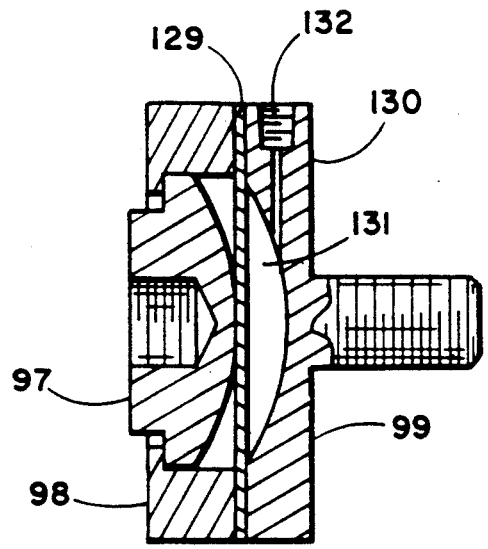
FIG. 3. Cross section of force transmitter.

A charged closed fluid path comprising a fluid cavity 131 and port 132 of force transmitter 130 (FIG. 3), conduit 88, conduit 87 port 80, cylinder 39. conduit 93, port 51, cylinder 35, conduit 94 and cylinder 36 (FIG. 2).

When the air pressure to canister 127 through port 93 reaches approximately 20 P.S.I. the force transmitter 130 will generate pressures in the above described closed fluid path to cause cylinder 36 to compress spring 32 to close normally open contacts of switch 40 (FIG. 2).

Being in the run mode, the enabling switch 137 of the pressure switch assembly 95 (FIG. 7) is closed, voltage from battery 10 is now present in cable 11, wire 13, closed contacts of enabling switch 137, wire 14, through switch 40, now closed, wire 15 and activating solenoid 22. Motor 21 drives pump 20, drawing fluid from reservoir 23 pressuring conduit 28 into port 47 through port 66 into conduit 67, conduit 84 (FIG. 2) to port 91 of cylinder 100, conduit 90 to port 91' of cylinder 100'. Pistons 103 and 103' connected to 101 and 101' begin to boost the force of the pressured air canisters 127 and 127' moving shaft 101 and 101', clevis 121 and 121', lever 122 and 122' to the right rotating cam 123 and 123' further tightening front shoes 125 and 125', rear shoes 126 and 126' against drum 124 and 124'.

Figure 1:
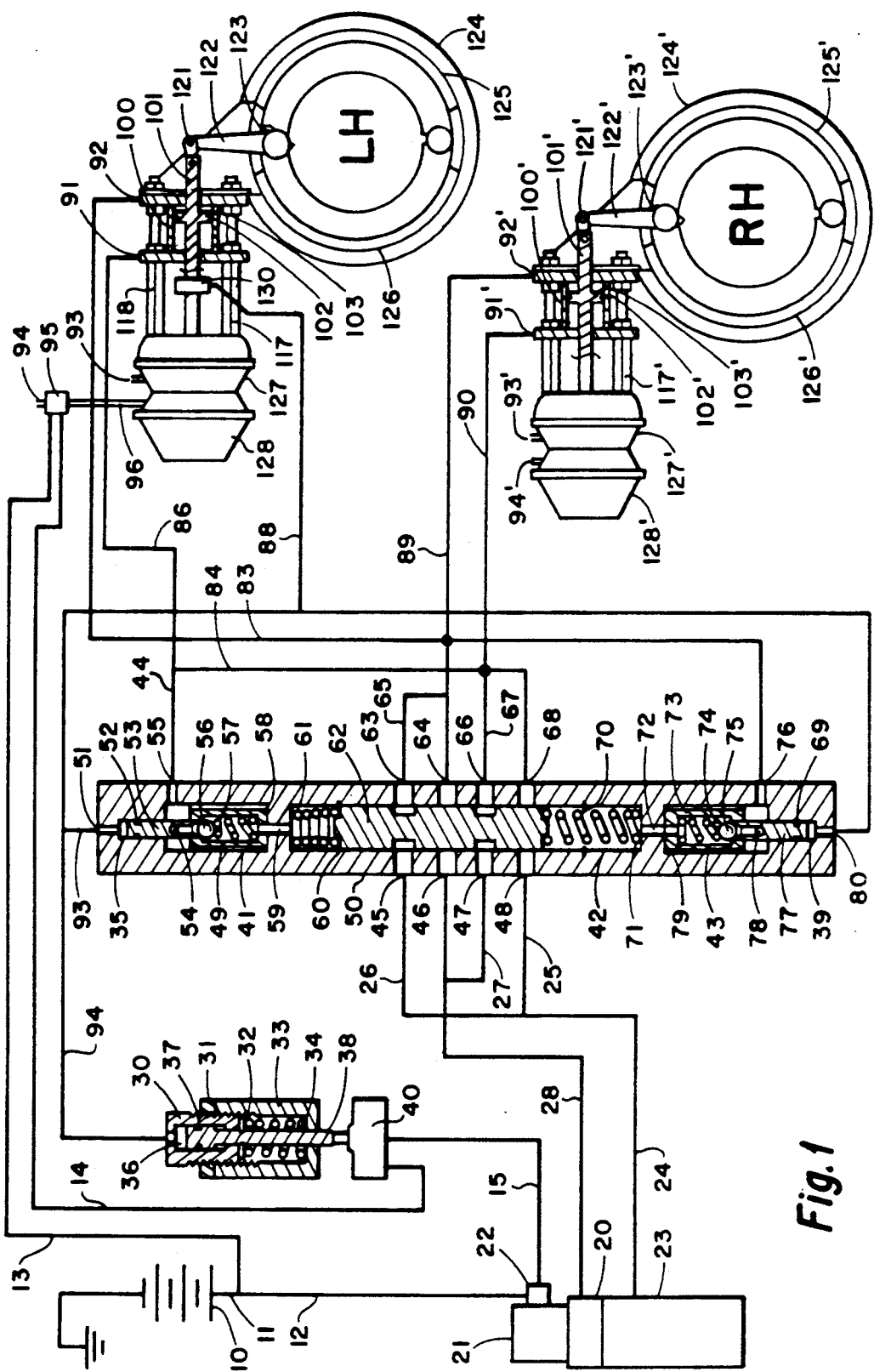
FIG. 1. Schematic drawing with the truck brakes in park or brakes applied and boosted.
Figure 8:
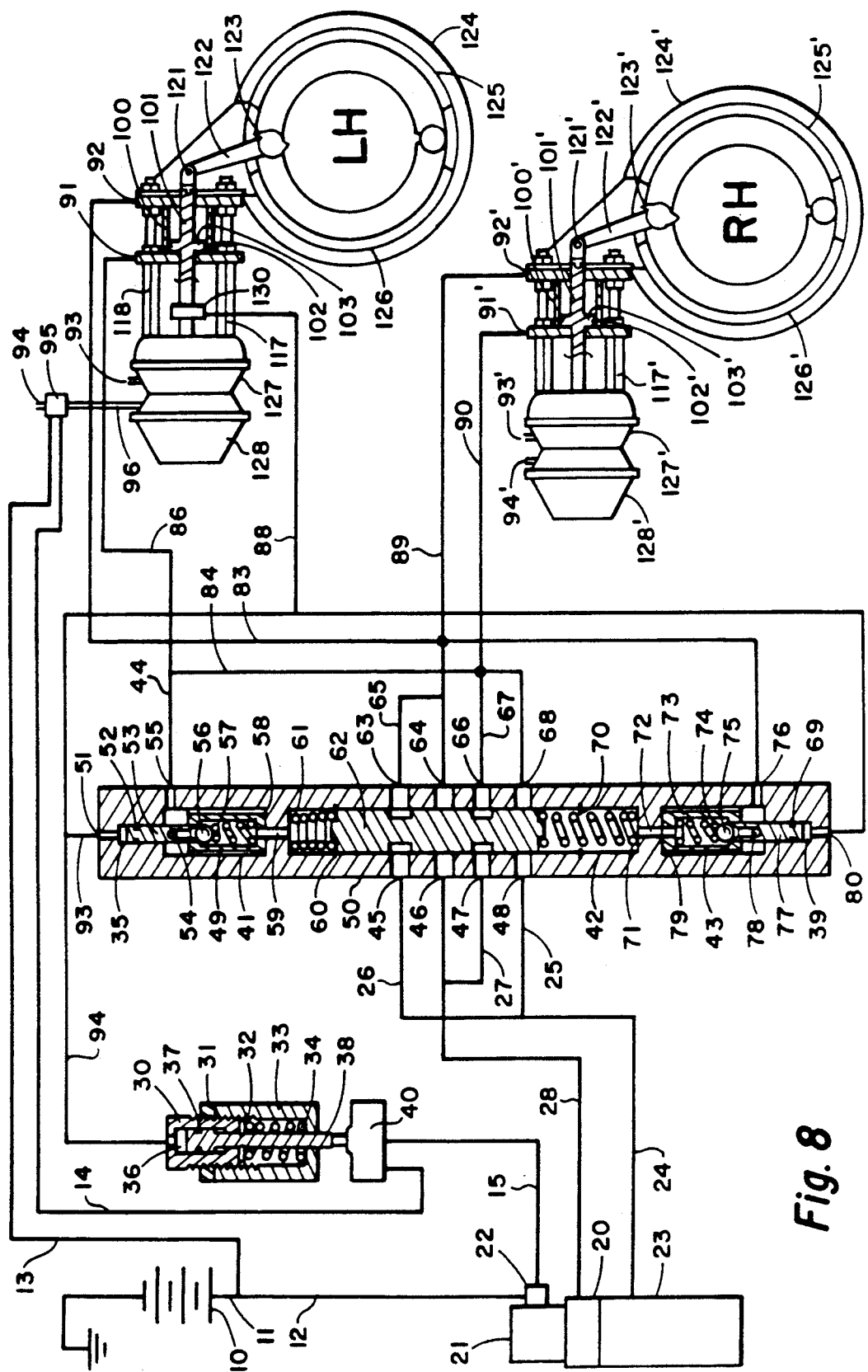
FIG. 8. Schematic drawing with truck in motion.

Simultaneously with these events, the force transmitter 130 (FIG. 2) is pressuring port 51 and port 80 via conduit 88 and conduit 87 of intermittent valve 50 (FIG. 1). This fluid pressure drives pistons 77 in cylinder 39 against ball 75 and piston 53 in cylinder 35 against ball 56. The pump pressure exiting port 66 into conduit 67, conduit 84 and conduit 44 is present in port 55 and orifice 54 (FIG. 1) against ball 56. The instant the fluid pressure from pump 20 exceeds the fluid pressure developed in force transmitter 130 (FIG. 1), the fluid pressure from pump 20 will pass the ball 56 through passage 59 to reposition the shuttle valve spool 62 against stop 70 (FIG. 2) redirecting the fluid pressure through port 46 and exits port 64 into conduit 83 and conduit 89 pressuring port 92, 92' and driving piston 103 and 103' to the left (FIG. 6) along with shaft 101 and 101', clevis 121 and 121', lever 122 and 122' rotating cam 123 and 123' to release front brake shoes 125 and 125' and rear brake shoes 126 and 126' from brake drums 124 and 124' allowing the tires to rotate. The fluid pressure driving pistons 103 and 103' is also entering port 76 (FIG. 8). The instant the fluid pressure from pump 20 exceeds the fluid pressure in force transmitter 130 the fluid pressure from pump 20 will pass the ball 75 through passage 72 to reposition the shuttle valve spool 62 against stop 60 (FIG. 8) and the fluid pressure from pump 20 is redirected as described earlier. This cycling continues in intermittent valve 50 until the operator releases the brake pedal. It is important to note that boosted/intermittent braking is accomplished with only one application of air.

Figure 9:
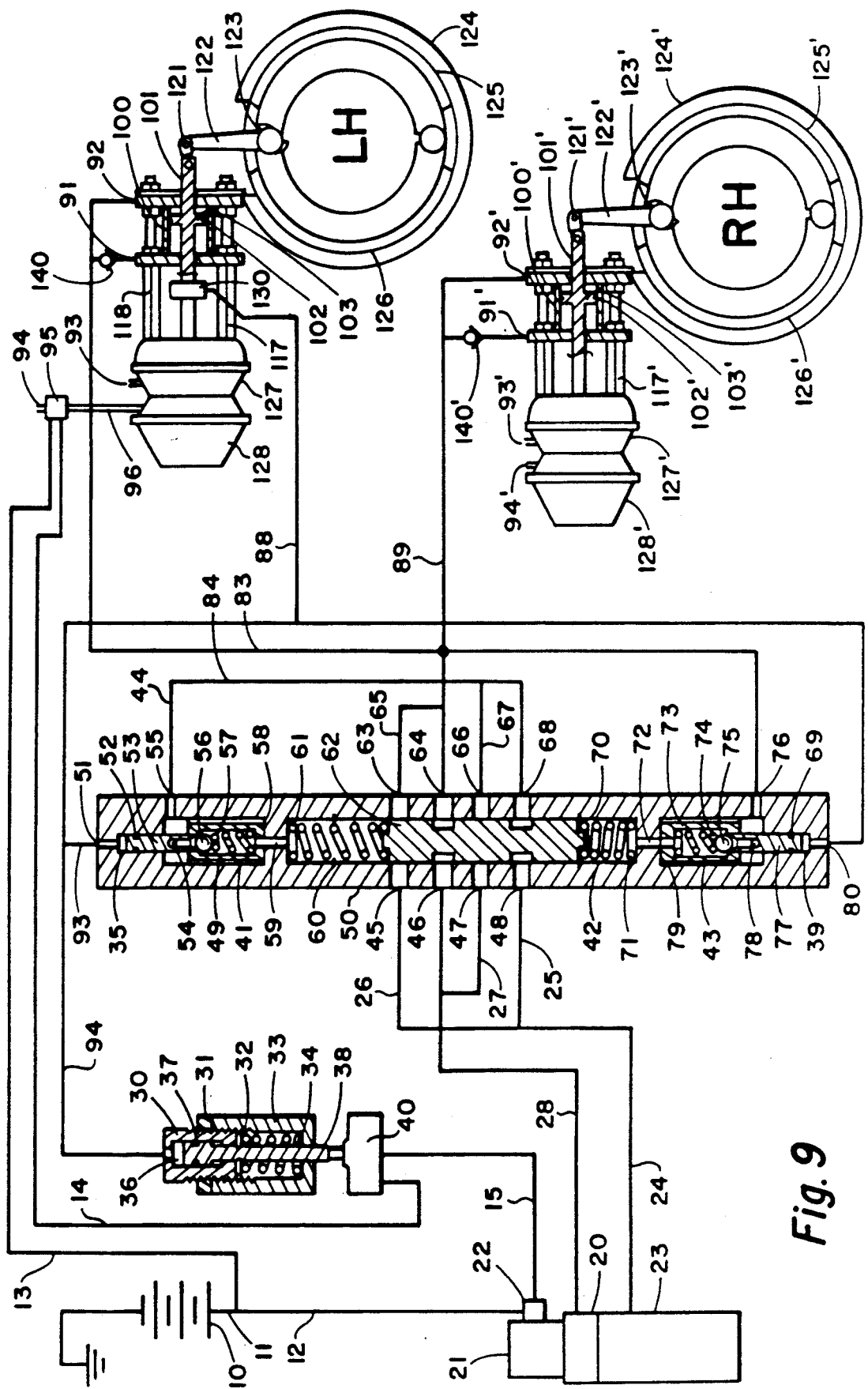
FIG. 9. Schematic drawing with intermittent brake capacity.

Intermittent braking only without the hydraulic boost may be accomplished by deleting conduit 86 and conduit 90 as shown in FIG. 1 and substitute check valves 140 and 140' (FIG. 9) connected from ports 91 and 91' to ports 92 and 92'. This allows pistons 103 and 103' to release the brake shoes but eliminates the boost. The intermittent valve 50 reacts to the reference pressure established by force transmitter 130 and the generated pressure from pump 20 as previously described.

PREFERRED EMBODIMENT

Battery 10 is a 12-volt, high cranking power unit available off the shelf, wired into the tractor truck charging system.

Hydraulic pump unit 20, motor 21 and reservoir 23 with 2,500 P.S.I. at G.P.M. or more is readily available from many sources.

The threshold pressure assembly 30 comprises cylinder 36 of sealed by O-ring 37. The outside diameter of cylinder is threaded for lock nut 31 and spring tension body 33. "C" clip 32 is located on the shaft of piston 36 to move approximately 0.18 inches travel. Spring 34 is selected to react with piston 36 at approximately 20 P.S.I. pressure. Adjustable body 33 is tapped for cylinder 36 threads contain spring 34 and provide loose fit for plunger shaft of piston 38. Cylinder 36 and normally open switch 40 are to be mounted in a fixed position with the adjustable body 33 and lock nut 31 to allow fine adjustment of the threshold pressure.

The force transmitter 130 (FIG. 3) is a diaphragm type device with a one square inch cylindrical ram 97 of mild steel with a dome face which is held in place by retainer 98 of mild steel. A 0.09 thick diaphram 129 of flexible plastic or neoprene is clamped and sealed between retainer 98 and receiver 99 of mild steel with a concave chamber 131. Hydraulic fluid fills chamber 131 and when ram 97 is forced into receiver 99 the generated pressure exits port 132.

The intermittent valve 50 is made of steel and comprised of identical differential valves on each end (FIG. 2), however it may be made as a separate valve (FIG. 4). A reference pressure developed in force transmitter 130 enters port 80 into cylinder 39 forcing piston 77 against 5/16 inch diameter ball 75 being resisted by spring 74. Pump 20 pressure enters port 76 and port 78 and internal tapered end of piston 77 against ball 75. Piston 77 diameter and the opposite end tapered opening is sized to provide 20 percent greater pressure to unseat ball 75 for pump 20 fluid pressure entering port 76 and exiting port 72 (FIG. 2) into cylinder 42 repositioning shuttle valve spool 62 against dampening spring 61 to stop 60. NOTE—When port 76 (FIG. 2) is being pressured from pump 20 via conduit 28, port 46, port 64 and conduit 83, port 55 is vented to reservoir 23 via conduit 55, conduit 84, port 68, port 48, conduit 25 and conduit 24. Fluid exiting port 59 from cylinder 42 (FIG. 2) is resisted by slide body 49, metal to metal seal 58 and ball 56, which combines into a cylinder and the high pressure being generated by shuttle valve spool 62 moving toward stop 60 cracks seal 58 and fluid flows through flutes A, B, C and D, Section AA (FIG. 5) allowing fluid to flow out port 55. Shuttle valve spool 62 (FIG. 1) is made of nylon and seals slides and is aligned by fluid pressure against stop 60 or stop 70 to direct fluid pressure and return ports in an oscillating action driven by differential valves as connected by port 59 and port 72.

The enabling switch 95 (FIG. 6) is made of high density plastic. Switch 95 body and cap 134 encircles flexible conduit 96 with plunger 136 made of aluminum being forced to dimple flexible conduit 96 by spring 133.

Cylinder 100 (FIG. 10) is made of hardened steel ground for sliding and sealed by O-ring 102 on steel piston 103 welded to steel shaft 101 with movement between steel end plates 109 and 110 and sealed by O-rings 104, 105 and 106. Spacers 117 and 118 are of hex steel and internally threaded to mate with canister 127 and 127' (FIG. 2). All threads 107 and 108 of hardened steel and nuts 112, 113, 114, 115 and 116 hold the cylinder together and to the truck axle. The ball joint 119 held in place by pin 120 allows clevis 121 to arc as the lever 122 is activated.

What is claimed is:

1. A braking apparatus comprising:
   a brake;
   a brake applying means for applying said brake;
   a compressed air operating means for operating said brake applying means such that, when an amount of compressed air pressure which is at least as large as a threshold compressed air pressure is applied to said compressed air operating means, said compressed air operating means imparts a force to said brake applying means which urges said brake applying means to apply said brake; and
   a second operating means for automatically operating said brake applying means such that, while said amount of compressed air pressure which is at least as large as said threshold compressed air pressure is applied to said compressed air operating means, said brake is alternatingly released and reapplied,
   wherein said brake applying means comprises an elongate shaft having a longitudinal axis, said elongate shaft being operably associated with said brake such that said brake is applied by moving said elongate shaft in a first direction along said longitudinal axis and said brake is released by moving said elongate shaft in a second direction along said longitudinal axis;

said compressed air operating means is associated with said elongate shaft such that, as long as said amount of compressed air pressure which is at least as large as said threshold compressed air pressure is applied to said compressed air operating means, said compressed air operating means urges said elongate shaft in said first direction; and said second operating means comprises:
  a piston connected to said elongate shaft and having a first side and second side;
  a hydraulic chamber surrounding said piston; and a delivering means for automatically alternatingly delivering, while said amount of compressed air pressure which is at least as large as said threshold compressed air pressure is applied to said compressed air operating means, a pressurized hydraulic fluid (a) to said hydraulic chamber on said second side of said piston such that said pressurized hydraulic fluid urges said piston and said elongate shaft in said second direction with sufficient force to cause said elongate shaft to move in said second direction and thereby release said brake and then (b) to said hydraulic chamber on said first side of said piston such that said pressurized hydraulic fluid operates with said compressed air operating means to move said elongate shaft in said first direction and thereby reapply said brake.

2. A braking apparatus as described in claim 1 wherein said delivering means comprises:
  a hydraulic fluid reservoir;
  a pumping means for pumping hydraulic fluid out of said hydraulic fluid reservoir to thereby provide said pressurized hydraulic fluid;
  first conduit means for conducting said pressurized hydraulic fluid from said pumping means to said hydraulic chamber on said first side of said piston; and
  second conduit means for conducting said pressurized hydraulic fluid from said pumping means to said hydraulic chamber on said second side of said piston.

3. A braking apparatus as described in claim 2 further comprising a directing means for automatically alternatingly directing said pressurized hydraulic fluid through said first conduit means and through said second conduit means.

4. A braking apparatus as described in claim 3 wherein said directing means comprises a fluid valve disposed in said first and second conduit means, said fluid valve including: a valve housing; at least one fluid inlet port; a first fluid outlet port associated with said first conduit means; a second fluid outlet port associated with said second conduit means; and at least one valve element contained in said housing, said valve element being positionable in a first position in said housing such that said first outlet port is open and said second outlet port is closed and said valve element being positionable in a second position in said housing such that said second outlet port is open and said first outlet port is closed.

5. A braking apparatus as described in claim 4 wherein said directing means further comprises:
  a means for establishing a reference pressure based on the amount of force being exerted on said elongate shaft by said compressed air operating means and
  differential valve means, operably associated with said fluid valve, for (a) automatically moving said valve element from said first position to said second position when the fluid pressure in said first conduit means exceeds said reference pressure by at least a first predetermined amount and (b) automatically moving said valve element from said second position to said first position when the fluid pressure in said second conduit means exceeds said reference pressure by at least a second predetermined amount.

6. A braking apparatus as described in claim 2 wherein said delivering means comprises a sensing and activating means for sensing the application of said amount of compressed air pressure which is at least as large as said threshold compressed air pressure to said compressed air operating means and for activating said pumping means.

* * * * *